Figures 1, 2:
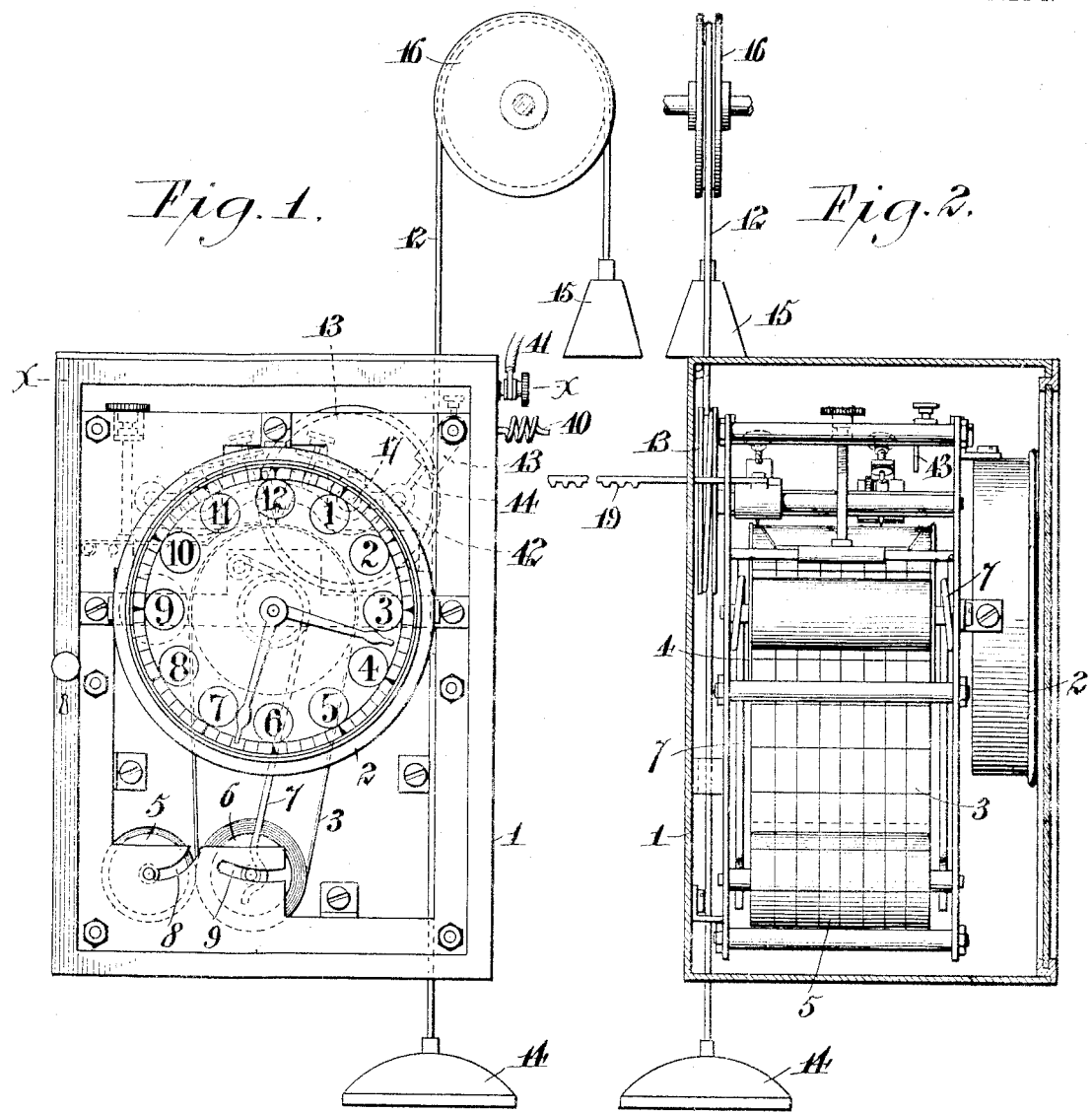

F. REED & W. RICKARDSON.
RECORDER OR INDICATOR.
APPLICATION FILED JAN. 13, 1912.

1,040,240.

Patented Oct. 1, 1912.
4 SHEETS—SHEET 1.

Witnesses:
Christ Feinle, Jr.
U. B. Hillyard

Inventors
Frank Reed and
Werner Rickardson
By Victor J. Evans
Attorney

F. REED & W. RICKARDSON.
RECORDER OR INDICATOR.
APPLICATION FILED JAN. 13, 1912.
1,040,240.
Patented Oct. 1, 1912.
4 SHEETS—SHEET 2.
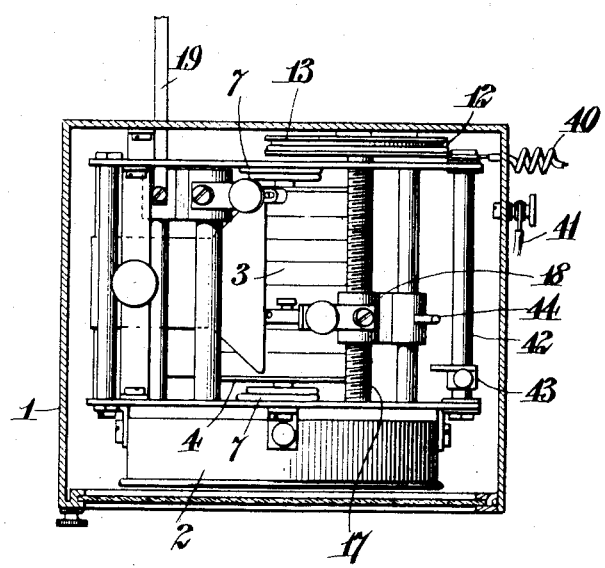
Fig. 3.
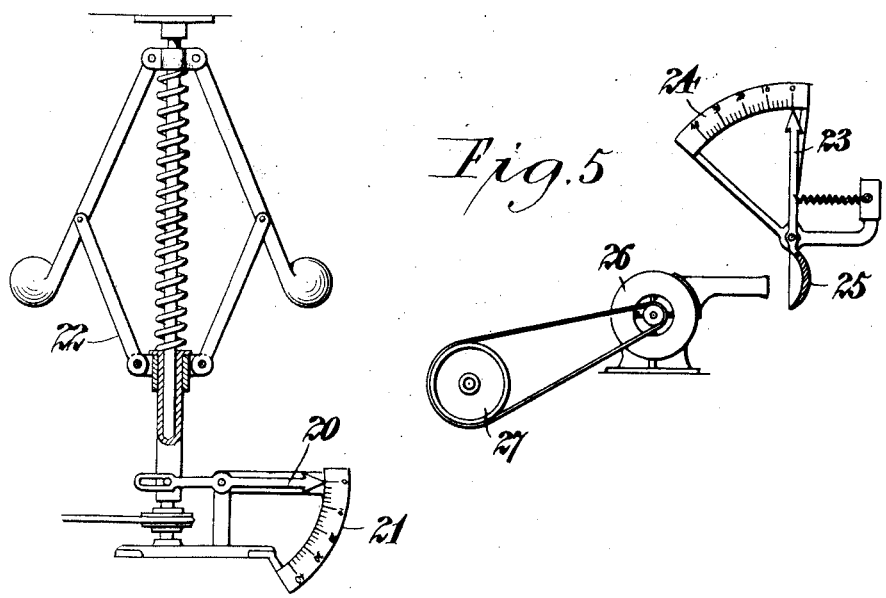
Fig. 4.
Fig. 5.
Witnesses:
Christ Feinle, Jr.,
U. B. Hillyard.
Inventors,
Frank Reed and
Werner Rickardson.
By Victor J. Evans,
Attorney.

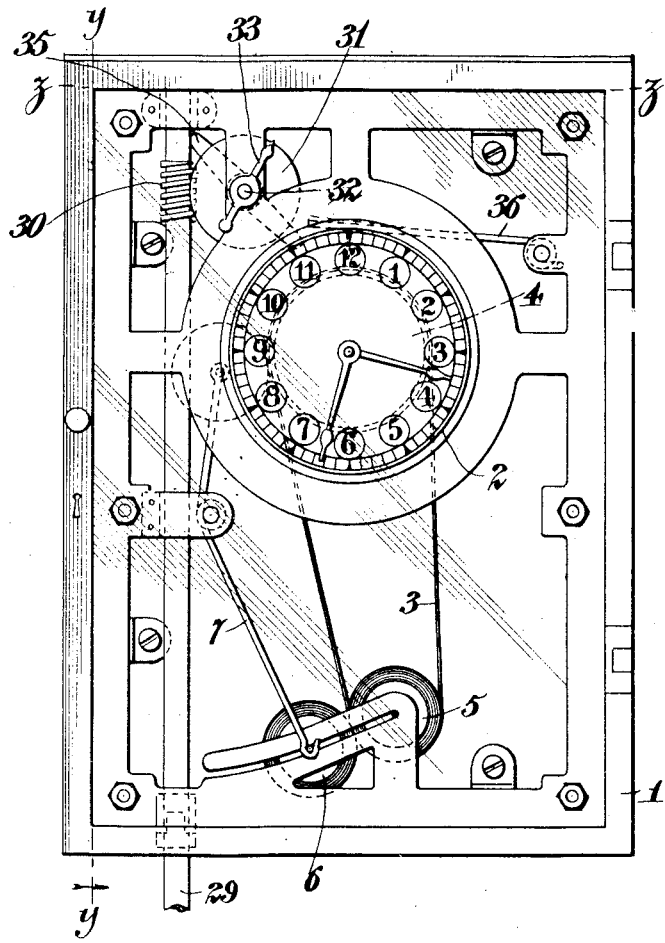
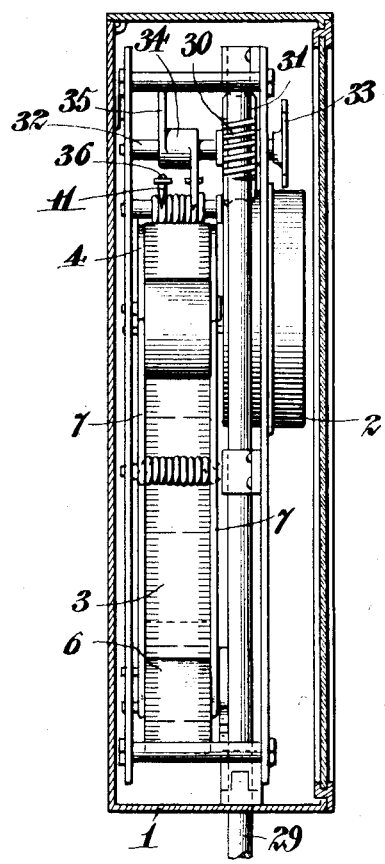
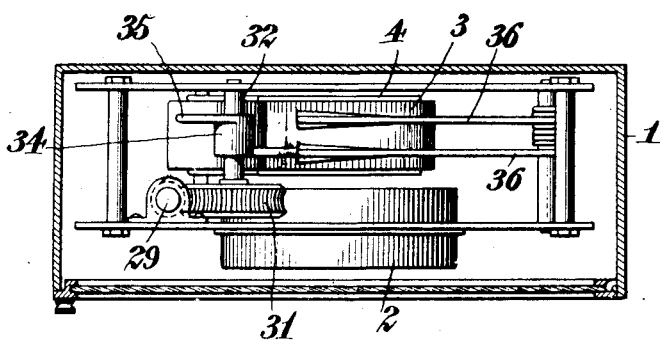

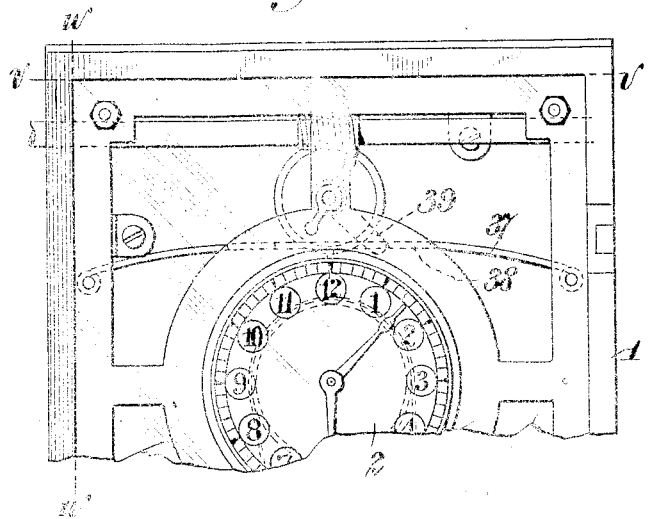
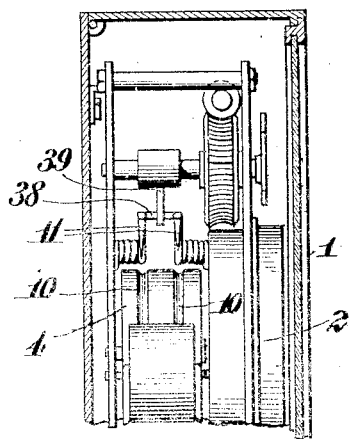
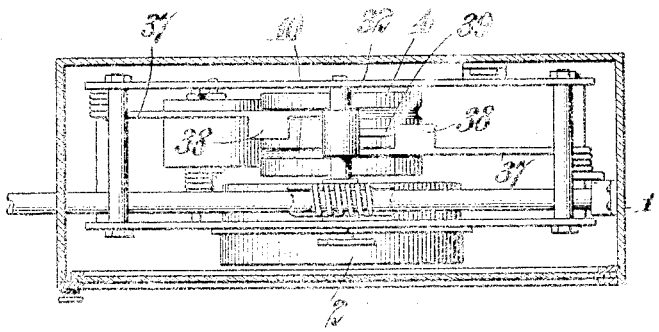

UNITED STATES PATENT OFFICE.

FRANK REED AND WERNER RICKARDSON, OF FALK, CALIFORNIA.

RECORDER OR INDICATOR.

1,040,240.

Specification of Letters Patent.

Patented Oct. 1, 1912.

Application filed January 18, 1912. Serial No. 670,987.

*To all whom it may concern:*

Be it known that we, FRANK REED and WERNER RICKARDSON, citizens of the United States, residing at Falk, in the county of Humboldt and State of California, have invented new and useful Improvements in Recorders or Indicators, of which the following is a specification.

The purpose of the present invention is the provision of a device for recording the speed of vehicles, variations in the level of liquids and differences in pressure of both liquids and fluids and also to indicate the speed of vehicles such as automobiles, trains and the like.

The invention also provides a mechanism for recording the particular time of the variations of liquids or fluids and the speed of vehicles so that on reference to any required time the fluid pressure or the speed may be ascertained.

The invention contemplates a time movement, a recording strip fed by the time movement and recording means actuated by the moving part according to the particular purpose for which the mechanism is designed.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a front view of a recorder embodying the invention. Fig. 2 is a side view of the mechanism, the near side of the casing being removed and parts being broken away. Fig. 3 is a horizontal section on the line *x—x* of Fig. 1. Fig. 4 is a detail view of a governor mechanism. Fig. 5 is a detail view of a modified form of governor mechanism for indicating speed. Fig. 6 is a view similar to Fig. 1 of a modification. Fig. 7 is a vertical section on the line *y—y* of Fig. 6, looking to the right. Fig. 8 is a horizontal section on the line *z—z* of Fig. 6. Fig. 9 is a front view of the upper portion of a further modified form. Fig. 10 is a vertical section on the line *w—w* of Fig. 9, looking to the right. Fig. 11 is a horizontal section on the line *v—v* of Fig. 9. Fig. 12 is a perspective view of a form of spring provided with a stylus or marking point.

Corresponding and like parts are referred to in the following description, and indicated in all the views of the drawings, by the same reference characters.

The mechanism embodies a casing 1 which may be of any suitable construction and design, the interior being accessible by means of a door which is made secure by any approved lock device, thereby preventing tampering with vitals.

A time movement 2 of any make or variety is located within the casing 1 and is adapted to operate the strip 3 upon which the record is made. The time movement is selected with a view of running a number of days without requiring rewinding. A pulley 4 has connection with a rotating part of the time movement to be operated thereby. The strip 3 passes over the pulley 4 and is fed thereby. Two pulleys 5 and 6 are located within the casing 1 preferably near the lower end thereof. One of the pulleys, as 6, has the strip 3 wound thereon and the other pulley 5 is adapted to have the strip wind thereon as the record is made. The pulleys 5 and 6 are arranged in contact so that the pulley 5 may be rotated by means of the pulley 6 so as to wind the strip 3 upon the pulley 5 as said strip is unwound from the pulley 6. The pulleys 5 and 6 are mounted to admit of their quick removal and also to allow for variation in diameter. As the strip 3 is unwound from the pulley 6 the diameter of said pulley decreases and the diameter of the pulley 5 correspondingly increases. The strip 3 is unwound from the pulley 6 by means of the positively driven pulley 4, the strip 3 being wound upon the pulley 5 by frictional contact with the pulley 6. Springs 7 engage the journals or ends of the shaft of the pulley 6 so as to press said pulley in contact with the pulley 5. The pulleys 5 and 6 are supported in plates in which are formed slots 8 and 9, the slots 8 curving upwardly and the slots 9 extending through the ends of the plates. The pulley 4 has grooves 10 opposite the styli or pointers 11 by means of which a record is made upon the strip 3. To prevent slipping and to insure a positive movement of the strip 3 the pulley 4 may be covered with rubber or may be provided with points. It is preferred to provide two pointers 11 one indicating the direction of travel of a vehicle when moving in one way and the other to designate the direction when the vehicle is moving the opposite way. The strip 3 may be ruled to indicate the hours and fractional parts thereof so that the time of the record may be readily ascertained on reference thereto.

When the mechanism is adapted for recording the change of level of water in a boiler or other receptacle or the ebb and flow of the tide a rope or cord 12 is provided and passed one or more times about a grooved pulley 13. A float 14 is attached to one end of the rope or cord 12 and a weight 15 is secured to the opposite end. The upper portion of the rope or cord passes over a pulley 16, which gives direction thereto. A threaded shaft 17 is connected with the pulley 13 so as to rotate therewith and a nut 18 is mounted upon the threaded shaft 17 and is provided with the styli or pointers so as to move the latter over the strip 3 according to the direction of movement of the shaft 17. The shaft 17 may be moved by any mechanism dependent upon the particular use for which the recorder is constructed. For indicating pressure a rack bar 19 is employed, the toothed part being arranged to engage a pinion on the arbor or the shaft provided with the indicating hand.

When the recorder is designed for use in connection with a steam boiler it is proposed to combine therewith an alarm for indicating high and low water levels, the alarm circuit including contacts which are closed at the predetermined high and low levels so as to apprise the engineer or other attendant of imminent danger, thereby giving ample warning so that the abnormal condition may be remedied to prevent disastrous results.

It is contemplated to indicate speed and to also record the speed of a vehicle at any time and in either direction.

Figs. 4 and 5 indicate means for showing the speed of the vehicle when in motion. In Fig. 4 a pointer 20 is moved over a scale 21 by means of a governor mechanism 22 of the weighted arm type. In Fig. 5 the pointer 23 is arranged to move over a scale 24, said pointer having a spoon or bowl 25 at one end to receive a blast of air created by means of a blower 26, which is operated from a pulley 27 mounted upon a worm shaft which has connection with the moving part of the vehicle. It is to be understood that the blower 26 will be operated with a greater or less speed depending upon the speed of the vehicle, thereby creating a blast of greater or less strength so as to operate the pointer 23 and move the same against the tension of a spring 28, which adjustably connects the pointer with a part of the framework.

In the operation of the mechanism the strip 3 is continuously moved by means of the pulley 4, which is driven in the same direction by the time movement. The strip is held smooth upon the pulley 4 by means of springs 7. As the strip passes over the pulley 4 an impression is made therein by the pointers or styli 11, the end of the record being determined by the position of the impression upon the strip.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claim appended hereto.

Figs. 6, 7 and 8 show a shaft 29 having a worm 30 meshing with a worm wheel 31 secured to a transverse shaft 32 which is provided with a pointer 33 and a hub 34 having oppositely disposed cams 35 arranged to engage two springs 36. Each spring 36 has a point 11 which is adapted to engage the strip 3. This form of recorder is for automobiles and analogous vehicles which travel in one direction only. The two springs 36 and cams 35 enable openings to be punched in the recording strip 3, since they operate alternately. In the event of backing the vehicle the cams 35 press downwardly upon the springs 36 without bringing the points 11 in contact with the recording strip, but when the vehicle is advancing the cams engage the under side of the springs 36 and lift the same a distance so that when they clear the cams the points 11 are brought into engagement with the recording strip to punch openings therein.

In the construction shown in Figs. 9, 10 and 11 two springs 37 are oppositely disposed each having a point 11 at its inner end and provided with an inner extension 38, which is adapted to be engaged by means of a cam 39 secured to the shaft 32. This construction of recorder is designed for railway cars and like carriers which travel forwardly and backwardly. When the car is moving in one direction one of the springs 37 is elevated by the cam 39 and when clearing said cam makes a record upon the strip 3 and the opposite spring 37 is depressed by the cam 39 without bringing the point 11 in contact with the strip 3. When the car moves in the opposite direction the operation is reversed, that is the spring 37 previously out of operation is caused to act to produce a record and the spring previously making a record is thrown out of operation.

The terminals of the alarm circuit are indicated at 40 and 41, the latter being connected with the frame and the conductor 40 having connection with a rod 42 which is electrically insulated from the frame and which has a movable contact piece 43 to be engaged by a projection 44 carried by the nut 18. The alarm circuit is chiefly designed for indicating danger in connection with high and low water level of boilers and high or low tides so that those engaged in the fishing industry may be advised as to the time when the tide reaches a given level.

Having thus described the invention what is claimed as new, is:—

In combination a recording strip, a spring having a marking point normally occupying a position to clear the strip, and a cam adapted to engage the spring in one direction to move the point thereof toward the recording strip without coming in contact therewith and to move said spring in the opposite direction to carry it away from the recording strip to increase the tension thereof to cause the point to engage with the recording strip when the spring clears the cam.

In testimony whereof we affix our signatures in presence of two witnesses.

FRANK REED.
WERNER RICKARDSON.

Witnesses:
FLORENCE M. CALKINS,
J. S. BURNELL.